United States Patent [19]

Horsthuis

[11] Patent Number: 5,282,078
[45] Date of Patent: Jan. 25, 1994

[54] METHOD OF MAKING A FREQUENCY DOUBLING STRUCTURE IN AN OPTICALLY NON-LINEAR MEDIUM, AND A FREQUENCY DOUBLING DEVICE

[75] Inventor: Winfried H. G. Horsthuis, Enschede, Netherlands

[73] Assignee: Akzo nv, Arnhem, Netherlands

[21] Appl. No.: 989,801

[22] Filed: Dec. 11, 1992

[30] Foreign Application Priority Data

Dec. 20, 1991 [NL] Netherlands ............... 9102139

[51] Int. Cl.⁵ .................................. G02F 1/37
[52] U.S. Cl. ................ 359/328; 156/629; 156/668; 385/122
[58] Field of Search ............ 385/122, 14, 129, 130; 359/326–332; 156/625, 629, 668

[56] References Cited

U.S. PATENT DOCUMENTS

| | | | |
|---|---|---|---|
| 4,865,406 | 9/1989 | Khanarian et al. | 350/96.12 |
| 4,971,416 | 11/1990 | Khanarian et al. | 350/96.12 |
| 5,006,729 | 4/1991 | Meijer et al. | 385/122 X |
| 5,028,109 | 7/1991 | Lawandy | 359/328 |
| 5,061,028 | 10/1991 | Khanarian et al. | 359/332 X |
| 5,106,211 | 4/1992 | Chiang et al. | 359/332 X |
| 5,155,620 | 10/1992 | Gordon et al. | 359/328 |
| 5,210,801 | 5/1993 | Fournier et al. | 385/14 |

FOREIGN PATENT DOCUMENTS

| | | | |
|---|---|---|---|
| 254921 | 2/1988 | European Pat. Off. | G02F 1/37 |
| 350112 | 1/1990 | European Pat. Off. | C08G 18/67 |
| 350113 | 1/1990 | European Pat. Off. | C08G 63/68 |
| 355915 | 2/1990 | European Pat. Off. | G02F 1/37 |
| 358476 | 3/1990 | European Pat. Off. | G03F 7/00 |
| 359648 | 3/1990 | European Pat. Off. | C08G 18/38 |
| 361602 | 4/1990 | European Pat. Off. | H01L 33/00 |
| 378185 | 7/1990 | European Pat. Off. | C08F 20/36 |
| 396172 | 11/1990 | European Pat. Off. | C08F 220/34 |
| 445864 | 9/1991 | European Pat. Off. | C08G 18/00 |
| 2187566 | 9/1987 | United Kingdom | G02F 1/37 |

OTHER PUBLICATIONS

M. S. Pereira et al., "Frequency Accommodation and Synchronisation in Digital TV Codec", Electronic Letters (Dec. 6, 1990) vol. 26, No. 25 pp. 2104–2105.

W. H. G. Horsthuis et al., "Simple Measuring Method for Electro-Optic Coefficients in Poled Polymer Waveguides", Appl. Phys. Lett. 55(7), Aug. 14, 1989, pp. 616–618.

P. R. Ashley et al., "New Poling Techniques for Electro-Optic Polymer Devices", Integrated Photonics Research 1991, p. 87.

D. J. Williams, "Organic Polymeric and Non-Polymeric Materials with Large Optical Nonlinearities", Angew. Chem. Int. Ed. Engl. 23 (1984), 690–703.

Primary Examiner—John D. Lee
Attorney, Agent, or Firm—Richard P. Fennelly; Louis A. Morris

[57] ABSTRACT

A frequency doubling structure composed of an alternatingly poled NLO polymer is incorporated into an optically non-linear (NLO) polymeric material. This structure is made by forming a layer of a first NLO polymer, partially removing it by etching after it has been poled with the aid of a first electric field or not, such that a grating structure is formed composed of etched grooves in the polymer, and applying a layer of a second NLO polymer, such that the etched grooves are backfilled, after which the resulting alternating structure of the two NLO polymers is subjected either to a second electric field oppositely directed to the first one, or in the case of poling of the first polymer not yet having taken place, to two oppositely directed electric fields in succession. The second electric field is applied at a temperature which will not affect the poling of one NLO polymer effected by the first electric field. Further, a frequency doubler comprising an alternating structure of oppositely poled NLO polymer is provided.

21 Claims, No Drawings

METHOD OF MAKING A FREQUENCY DOUBLING STRUCTURE IN AN OPTICALLY NON-LINEAR MEDIUM, AND A FREQUENCY DOUBLING DEVICE

The invention relates to a method of making a frequency doubling structure in an optically non-linear polymeric material, in which process alternating poling is effected in the optically non-linear material. The invention also relates to a device comprising such a frequency doubling structure. Hereinafter, such devices will be referred to as "frequency doublers".

Nowadays, because of developments in the field of solid state lasers, it is possible in many optical techniques to employ electromagnetic radiation of which the wavelength falls at the nearby infrared end of the electromagnetic spectrum or even within that region thereof in which there is the presence of visible light (red). However, for many optical applications, it is desired to be able to use light of a wave-length which falls within the middle region of the visible light range or at the far removed (blue) end thereof. Examples of applications for which this is particularly desired include optical data storage, optical communication techniques, scanning, and optical medical applications. To provide a light source emitting a single wavelength in the desired region, it is known to pass electromagnetic radiation emitted by an existing light source, e.g. a laser having a wavelength in the range of, say, approximately 700 to approximately 1300 nm, through a frequency doubler, which will give a light source emitting a wavelength of half that length, i.e. in the range of approximately 350 to 650 nm. In such a method it is known to employ optically non-linear materials, as a frequency doubling structure.

optically non-linear materials, also called non-linear optical (NLO) materials, are known. In such materials non-linear polarization occurs under the influence of an external field of force (such as an electric field). Non-linear electric polarization may give rise to several optically non-linear phenomena, including the generation of second harmonics, i.e., frequency doubling.

Polymeric NLO materials also are known. Obtaining the desired NLO effect in these macroscopically initially requires that the groups present in such a material, mostly hyperpolarizable side groups, be aligned (poled). Such poling is usually effected by exposing the polymeric material to electric (d.c.) voltage, the so-called poling field, with such heating as will render the polymeric chains sufficiently mobile for orientation.

For example, a method as described in the opening paragraph is known from U.S. Pat. No. 4,865,406. The frequency doubler disclosed in that patent comprises a substrate-supported thin layer of an alternatingly poled NLO polymer. The frequency doubling structure is made by providing the layer of NLO polymer on either side with layers of cladding and subsequently with aluminum electrodes. The aluminum electrodes are given a grating structure with the aid of a photoresist. Next, with heating, the layer of NLO polymer is exposed to an electric field. According to the description, this gives poled sections alternating with unpoled sections. Guidelines on how to produce the disclosed alternating alignment, which is essential to practicability, are not provided.

The envisaged alternating structure is needed to prevent light subjected to frequency doubling from being wholly or partially extinguished prior to leaving the frequency doubler. Such extinction is connected with the so-called "coherence length". This is the distance between two spaced apart points, A and B, with the frequency doubled component of the light of the original wavelength travelling through the frequency doubler generated at point B being in counterphase to a frequency doubled component of the original light already generated at point A. To prevent such extinction, the periodicity of the alternatingly poled polymeric NLO material should be equal to twice the coherence length. This is known, for example, from U.S. Pat. No. 4,971,416.

The phase matching of radiation waves propagating through a polymeric NLO waveguide is also known from U.S. Pat. No. 5,061,028. The disclosed waveguides have a thin film laminated matrix comprising a substrate which supports a first electrode layer, a dielectric buffer layer, a second electrode layer, a polable organic waveguiding medium, and a third electrode layer. The first and second electrodes are adapted to apply electric fields of opposite polarity in conjunction with the third electrode functioning as a zero potential ground electrode. In order to achieve the desired alternating poling, the second electrode is patterned. This is a rather complicated method of employing an alternating poling field, without relief for the drawbacks attended therewith, such as a relatively high chance of lateral burnout and undesired inhomogeneity of the poling field due to the electrodes' edge effects (the deviating concentration of lines of force which always occurs at the electrode edge).

U.S. Pat. No. 3,842,289 (to Yariv) teaches a phase matched thin film waveguide which is produced by etching grooves in a film of inorganic NLO material, and filling the grooves with a material that does not possess an NLO coefficient, or whose NLO coefficient differs from that of the grooved material. The Yariv teaching is confined to materials that inherently possess an NLO coefficient, so that it does not pertain to polymeric NLO materials. A major element of the problem underlying the present invention is the requirement that polymeric NLO materials be aligned in order to exhibit an NLO coefficient.

European Patent Publication No. 481,510 pertains to the formation of a frequency doubling structure in polymeric NLO material by providing a grating structure of poled NLO polymer alternated with grooves, and filling the grooves with isotropic NLO polymer. In one embodiment an alternatingly poled structure is described, it being taught that to arrive at this structure an NLO material should be used in which the softening temperature is increased during or after poling. In that case the same NLO material is applied twice. The first time the NLO material is poled and etched, so as to form a grating structure of poled NLO material having an increased softening temperature, and thereafter the NLO material is applied a second time to backfill the grooves with as yet unpoled NLO material. The second batch of NLO material is thereupon poled in the opposite direction.

The present invention has for its object to provide a method by means of which an alternatingly poled frequency doubling structure can be incorporated into an NLO polymer in a comparatively simple manner. Further, it is envisaged to provide a frequency doubling structure having the highest possible modulation depth of the poling-induced second-order NLO coefficient, $X^{102}$ (see D. J. Williams et al. in Angew. Chem. Int. Ed. Engl. 23 (1984), 690-703), and not having any change of the index of refraction occurring in the optical path, which also contributes to an improved yield.

To this end, the invention resides in that the following steps are incorporated into a method of the abovementioned known type:
forming a layer of a first NLO polymer;
partial removal of the layer of the first NLO polymer by etching, such that a grating structure is formed composed of etched grooves in the polymer; and
applying a layer of a second NLO polymer, such that the etched grooves are backfilled, to form an alternating structure of the two NLO polymers,
in which method successive use is made of a first electric field and a second, oppositely directed electric field, such that the alternating structure of the two NLO polymers is subjected to the second electric field at a temperature which will not affect the poling of one NLO polymer effected by the first electric field.

Hence it is possible not to apply the first and second electric fields until after the alternating structure has been formed, but also to pole the first NLO polymer prior to the layer of the second NLO polymer being provided. The requirement to be met according to the invention with respect to the temperature at and period of time over which the second electric field is employed, is that when the second NLO polymer is poled, which poling will inevitably be attended with the exposure of the alternating structure of the two NLO polymers to an electric field, the alignment of the first polymer is not affected. Of course, the scope of the invention permits the first NLO polymer to be poled still at this stage under the influence of a third electric field at such a temperature as will not affect the alignment of the second polymer, but this is not the preferred embodiment.

It should be noted that for many NLO polymers the temperature at which the alignment is affected under the influence of an electric field is dependent on the period of time over which the polymer is exposed to the electric field. For clarity, this description speaks always of temperature (assuming the fiction of a fixed period of time). Within the scope of the invention varying the time must be regarded as a technique for changing the temperature to be employed for a particular NLO polymer.

The maximum temperature at which the alternating structure of the two NLO polymers can be subjected to the second poling field is dependent on the individual polymers. However, in actual practice it is relatively easy for the person of ordinary skill in the art to determine above which temperature the alignment of a particular NLO polymer will be affected by an electric field. One way of determining this is by carrying out such a relaxation measurement as described by C. P. J. M. van der Vorst and C .J. van Weerdenburg in *Proc. SPIE-Int. Soc. Opt, Eng.*, 1337 (1990), p. 246. For instance, a fixed time period may be adhered to to study different temperatures/temperature ranges. Alternatively, of course, it is also possible to vary the period of exposure to the poling field at a particular temperature.

By way of a general guideline, it can be stated that the temperature at which the alignment of a polymer is not affected will, as a rule, be a temperature below the glass transition temperature ($T_g$). For a thermoplastic polymer $T_g$, in this case stands for the glass transition temperature as it can be determined by the conventional techniques. These techniques are known to the person of ordinary skill in the art. In the case of a thermosetting polymer, there is no question of an actual $T_g$ above which flow will occur, but rather of an "apparent $T_g$" above which the polymer chains and the present hyperpolarizable groups will become so mobile as to have their orientation influenced by an electric poling field. Within the scope of the invention, the term "NLO polymer" always refers to thermoplastic, generally amorphous polymers, as well as to thermosets. Also included within the term "NLO polymer", according to the invention, are suitable oligomers, copolymers, mixtures of polymers, and other suitable organic NLO materials out of which an etchable layer can be made. The temperature above which an NLO polymer can be poled is commonly indicated with the known term "softening point".

In general, it is not relevant to the method according to the invention at which moment the first poling field and the oppositely directed second poling field are applied. For instance, the layer of the first NLO polymer may be poled immediately after it has been formed. In that case, the second NLO polymer has to be poled at a temperature at which the already applied poling of the first polymer will be maintained. Alternatively, it is possible to first form the desired alternating structure of the two NLO polymers, and then apply the poling fields. The alignment of the NLO polymer poled first must not be affected in this case by the second, oppositely directed electric field effecting the alignment of the other NLO polymer. If the NLO polymer used is a thermosetting composition, the sequence in which the poling fields are applied may be of importance. On the one hand, this is because, in general, such compositions should be poled and cured simultaneously, on the other, because for such compositions at least some degree of curing is presumed when forming a sufficiently tough layer of polymeric NLO material.

An advantage of the present method is that it is possible to apply two oppositely directed poling fields in succession. It is pertinent to note here that the object in U.S. Pat. No. 4,865,406 is presumably to apply an alternating electric poling field to obtain alternating alignment. However, the use of an alternating poling field is attended with several drawbacks, the principal one being that electrodes of different polarities have to be positioned too closely, which makes for a major chance of lateral burnout. Because of the electrodes, edge effects (the deviating concentration of lines of force which always occurs at the electrode edge), the field profile of the poling field in the polymeric layers will deviate significantly from the desired homogeneous vertical profile. Such drawbacks can be avoided using the method according to the present invention, since the use of electrodes extending along the entire polymeric layer makes it possible to have these edge effects occur outside the polymer to be poled.

It should also be noted that the electric voltage generated by the poling field generally is d.c. voltage, but that it has also proved possible, under certain conditions described in the literature, to make use of a.c. voltage, as described in Paul R. Ashley and Thomas E. Tumolillo, *Opt. Soc. Am. Technical Digest Series*, Vol. 8, p. 87 (1991).

Preferred embodiments of the method according to the invention will be exemplified hereinbelow.

The step in which the first layer of NLO polymer is formed may consist of applying a polymer solution to a suitable substrate, e.g. by means of spincoating, followed by evaporating the solvent. Suitable substrates may include silicon wafers or plastics laminates, such as those based on epoxy resin, which may be reinforced or not. Suitable substrates are known to the person of ordinary skill in the art. The type of substrate is not essential to the method according to the present invention. The layer of NLO polymer can also be formed by molding, injection molding, or other known processing techniques.

After having been poled or not, the layer of the first NLO polymer so formed is partially removed by etching, such that a grating structure, composed of grooves etched into the polymer, is formed. For the etching any suitable etching technique may be employed, e.g., those known in the manufacture of integrated circuits (ICs). For example, use might be made of wet-chemical etching techniques, e.g. with organic solvents or strong bases being employed. It is preferred, however, to make use of dry-chemical etching techniques, such as sputter etching, reactive ion etching, or reactive plasma etching. Such techniques are known to the person of ordinary skill in the art. Alternatively, there may be etching using a laser, mechanical etching, such as grinding, cutting, drilling, or etching through bombardment with sanding particles, such as alumina, silica, and more particularly, pumice. The preferred etching technique is dependent on the NLO polymer employed. The person of ordinary skill in the art is expected to be able to select an appropriate etchant for the NLO polymer in question without undue experimentation. Preferably, use is made of $O_2$ plasma, and a very well defined grating structure can also be obtained using the so-called laser ablation technique.

To obtain the desired toothed structure, it is recommended especially when using non-mechanical etching techniques to apply a mask to cover those parts which should remain free from attack by the etchant. These masks, the chief prerequisite of which is that they be resistant to the action of the etchant, are known, for example, from IC technology. Such a mask may be preformed and made up of, e.g., either metal or synthetic material. Alternatively, it can be made by applying a photosensitive material (a photoresist) and subsequently exposing and developing it in accordance with the desired pattern.

Instead of etching the NLO polymer, it is also possible to produce a toothed structure without removing material, e.g., by means of embossing. In such a method the formation of grooves is attended either with heightening at the side of the grooves or with increased density of the material tamped down in the grooves.

The invention also relates to methods in which the etching step may be omitted because the layer of the first NLO polymer is already provided with the desired toothed structure as it is formed. Such may be achieved using shaping and processing techniques known in the treatment of polymers which are known to the person of ordinary skill in the art. As an example may be mentioned (injection) molding in a mold. In this method a thermosetting composition which is very readily moldable in the uncured state and, in general, easy to release from the mold in the cured state may advantageously be employed as the first NLO polymer. The thermosetting composition is then cured in the mold with simultaneous exposure to the first poling field. In the case of molding an NLO thermoset, the substrate may be omitted so as to obtain a free standing, toothed, NLO polymer layer.

The grating structure is of vital importance to the action of a frequency doubler manufactured according to the present invention, since it determines the structure of the alternatingly poled NLO polymer as it is ultimately obtained. As has been indicated above, the periodicity of the alternating structure should be equal to twice the coherence length. As appears from, for example, U.S. Pat. No. 4,971,416, which was mentioned hereinbefore, the following can be said to hold for the spatial periodicity $\Lambda$: $\Lambda = 2l_c = 2\pi/\Delta k$, wherein $l_c$ equals the coherence length and $\Delta k$ stands for the difference in wave vectors between the frequency doubled optical wavefront and the original (frequency generating) optical wavefront.

On the basis of the wavelength of the light subjected to frequency doubling the person of ordinary skill in the art is able to select the correct grating constant. Hence the layer of the first NLO polymer comprises grooves (preformed or applied later) having a width equal to half of the coherence length, thus leaving polymeric sections which could be called "teeth", which teeth also have a width equal to half of the coherence length.

In the next process step according to the invention the grooves are backfilled with the second NLO polymer. Again, the polymer may be applied from solution, with subsequent evaporation of the solvent, but it may also be in the form of a liquid or low viscous thermosetting composition, which is then cured with simultaneous exposure to a poling field. The final structure in that case will be made up of alternating sections of the first and the second NLO polymer, with the space between successive sections of the same NLO polymer always being equal to half of the coherence length.

To obtain a well-defined alternating structure of the two NLO polymers, the greatest possible effort needs to be made to prevent part of the first polymer from being dissolved in any solvent used to apply the second NLO polymer. By making use of a volatile solvent, optionally with rapid heating, so that the solvent may be removed before it can cause the aforementioned drawback, such dissolution may be obviated. It is preferred, however, to employ a solvent for the second polymer which will not cause the first polymer to be dissolved or even to swell. More particularly, it is preferred that the first NLO polymer is a thermosetting composition, since the resulting cured polymeric network will usually prove resistant to most of the solvents employed for NLO polymers.

Poling the NLO polymers in the method according to the invention is by means of the application in a known manner of an electric field. To this end, the material to be poled, which is commonly deposited on a substrate, is provided with electrodes connected to a rectified voltage feed and, e.g., placed on a controlled temperature table. Voltages of some tens to several hundreds of volts per $\mu m$ of polymer layer thickness are common. The period of exposure to the electric field is generally in the range of a few seconds to several minutes, but may also be from some tens of minutes to one hour, especially when use is made of a thermosetting NLO composition. The period of time required is further dependent on the temperature at which poling takes place. As has been stated above, this temperature is dependent on the NLO polymers used, but it will generally be in the range of from about 50° to about 350° C., more particularly in the range of about 80° to about 200°

C. The poling field is maintained as the poled material is cooled down to ambient temperature.

Representative poling temperatures and the appropriate periods of time required are known from various patent publications. Thus, it is known from European Patent Publication No. 378,185 to expose an NLO copolymer described therein to an electric field strength of $8 \times 10^5$ V/CM for a period of 20 minutes at a temperature of 85° C. In U.S. Pat. No. 4,865,406 an NLO polymer described therein is exposed for 10 minutes to an electric field strength of 70 V/$\mu$m at a temperature of 90° C. European Patent Publication No. 396,172 describes the alignment of an NLO polymer by means of corona discharge at a temperature of 127° C. In European Patent Publication No. 445,864, in which there is a disclosure of an NLO thermoset, a thermosetting composition is cured and poled at a temperature of 145° C. over a period of 15 to 45 minutes. In European Patent Publication No. 359,648 there is poling under the influence of an electric field of 50 V/$\mu$m at a temperature of 100° C. for a few seconds.

Together with other patent and technical literature, said publications provide guidelines for poling under the influence of an electric field for a wide range of polymeric NLO materials. On the basis of the prescribed step according to the invention of the alternating structure of the two NLO polymers being subjected to a second electric field which will not affect the alignment of one already poled NLO polymer, the person of ordinary skill in the art, given the literature, is in a position to determine which polymers to use to form the layer of the first NLO polymer and in the application of the second NLO polymer. Also, he would be able to determine whether it would be wise to pole the first NLO polymer directly, or more convenient to make the alternating structure of the two polymers and then subject the whole to the first and second electric fields.

In this connection, it is preferred to select the polymer requiring the highest poling temperature as the first NLO polymer, and as the second NLO polymer, a polymer that can be poled at a temperature at which the poling of the first NLO polymer is not affected. A practical sequence in this case is poling the formed layer of the first NLO polymer in its entirety, etching, applying the second NLO polymer, and then subjecting the alternating structure formed to a poling field that will effect poling of the second NLO polymer.

It is pointed out, however, that in the preferred embodiment, the processing of poled material is avoided by first making the desired alternating structure of first and second NLO polymer, and then carrying through the oppositely directed poling of both NLO polymers. This can be done by applying a poling field in one direction at a temperature sufficient to orient both NLO polymers, and applying an oppositely directed poling field at a lower temperature, so as to reverse the poling of one NLO polymer.

When use is made of one thermosetting composition and one amorphous, thermoplastic polymer, the temperature at which the composition is cured generally will exceed the $T_g$ of the amorphous polymer. In that case, the sequence must be as follows: using the thermosetting composition to form the layer of the first NLO polymer, curing it with simultaneous poling with exposure to an electric field, followed by etching, applying the second NLO polymer, and then exposing the alternating structure formed to the second electric field at a temperature at which the poling of the thermoset is not affected. In the case of both NLO polymers being thermosets, it is again necessary to pole the layer of the first NLO polymer with curing prior to the application of the second NLO polymer. Of course, in such a case, the second NLO polymer must be polable and curable at a temperature at which the poling of the first thermoset is not affected.

In general, the structure of alternatingly poled NLO polymers formed using the method according to the invention will be enveloped in a cladding to realize a waveguide in the structure. The index of refraction of such a cladding is lower than that of the enclosed polymer. Depending on the NLO polymers used, it is also possible to realize a waveguide by creating in the NLO polymer a channel having a higher index of refraction than the surrounding material, e.g. by the method set forth in European Patent Publication No. 358,476.

The invention further relates to a device for frequency doubling. This is a device of the type known from the aforementioned U.S. Pat. Nos. 4,971,416 and 4,865,406. This type of frequency doubler comprises an NLO polymer composition incorporating an alternating structure, such that oppositely poled sections of NLO polymer alternate, the space between successive sections of NLO polymer of the same alignment being equal to half the coherence length. The frequency doubler according to the invention is characterized in that the alternating sections of oppositely poled NLO polymer are each made up of a different NLO polymer, with the sections having the same alignment being made up of the same NLO polymer.

The device according to the invention can be manufactured employing the method described hereinbefore and will then have the advantages of an optimum modulation depth (the oppositely poled sections have the same degree of alignment) and clear-cut transitions between the oppositely poled sections.

In such a frequency doubler use may be made of known NLO polymers. Examples of such NLO polymers include those described in European Patent Publication Nos. 350,112, 350,113, 358,476, 445,864, 378,185, and 359,648, as well as those described in the U.S. patents mentioned hereinbefore. The invention is not restricted to any particular type of NLO polymer. Its essence lies in the use of two different NLO polymers. The term "different" refers primarily to such a difference in physical properties that the temperature below which the alignment of the hyperpolarizable groups present is not affected is different for the two NLO polymers, preferably by at least about 10° C., more particularly by about 20° C., while the optical properties are substantially identical.

A major advantage of this preferred embodiment is that the wavefronts propagating through the frequency doubling alternating structure are confronted hardly, if at all, with a refraction index contrast or a refraction index gradient.

According to a preferred embodiment of the present invention, the first and second NLO polymers used are similar, hence, compatible polymers differing only with respect to $T_g$. Such NLO polymers include the polyurethanes described in U.S. Pat. No. 5,001,209. These polyurethanes are prepared from a hyperpolarizable group-containing diol and a diisocyanate. The $T_g$ can be set by varying the diisocyanate. For instance, a disclosed polyurethane based on IPDI (isophorone diisocyanate) and a particular diol has a $T_g$ of 130° C., whereas a polyurethane based on the same diol in which the diisocyanate is THMDI (2,2,4-trimethyl hexamethylene diisocyanate) has a $T_g$ of 75° C. By using mixtures of diisocyanates it is generally possible to set the $T_g$ of these polyurethanes as desired. Of course, it is also possible to use a plasticizer to set the $T_g$ of the NLO polymers. Plasticizers, such as dioctyl phthalate, and their effect on the softening temperature of polymers are known to the person of ordinary skill in the art.

When use is made of NLO polymers of different $T_g$ in which the hypolarizable groups are the same and the other monomers wholly or partially different, the optical properties of the two different NLO polymers will generally be virtually identical. Because of this dominance on the part of hyperpolarizable groups, it is possible to employ NLO thermosets and non-crosslinked (linear or branched) NLO polymers of virtually identical optical properties.

In addition, the frequency doubler according to the invention may comprise all structural characteristics conceivable. For example, the device comprises a component for coupling light into the frequency doubler. For research purposes it is typical to employ a coupling prism to this end. The well-known prism coupling technique is described in, for example, *Applied Physics Letters*, 55 (1989), 616-618, and it is also used in the aforementioned U.S. patents. In actual practice, a coupling prism is not very functional and for the coupling of frequency generating light use will be preferably made of an optical fibre or a laser lens. The device further comprises a waveguide, i.e., a layer or a channel through which the coupled and the frequency doubled light can travel. Commonly such a waveguide will be made up of a core layer of polymer which is to some degree transparent to at least a portion of the coupled light, enveloped by cladding layers of a different polymer having a lower index of refraction for the envisaged light than the core layer does. According to the invention, the core layer comprises a frequency doubling structure as described hereinbefore. Preferably, the core layer is composed in its entirety of such an alternatingly poled structure of NLO polymer. For background data on frequency doubling devices reference is made to European Patent Publication Nos. 361,602, 355,915, and 254,921, and British Patent No. 2,187,566, as well as to *Electronics Letters*, 26 (1990), 2105-2107.

The foregoing illustrate certain embodiments of the present invention and, for that reason should not be construed in a limiting sense. The scope of protection sought is set forth in the claims which follow.

I claim:

1. A method of making a frequency doubling structure in an optically non-linear polymeric material, in which method alternating poling is effected in the optically non-linear material comprising the following steps:
   forming a layer of a first NLO polymer; partially removing of the layer of the first NLO polymer by etching, such that a grating structure is formed composed of etched grooves in the polymer; and
   applying a layer of a second NLO polymer, such that the etched grooves are backfilled, to form an alternating structure of the two NLO polymers,
   successive use being made of a first electric field and a second, oppositely directed electric field, such that the alternating structure of the two NLO polymers is subjected to the second electric field at a temperature which will not affect the poling of one NLO polymer effected by the first electric field.

2. A method according to claim 1 wherein the layer of the first NLO polymer is formed by applying a polymeric film to a substrate.

3. A method according to claim 2 wherein first the alternating structure of the two NLO polymers is formed, and then the successive electric fields are applied.

4. A method according to claim 2 wherein the two NLO polymers are amorphous, thermoplastic polymers with glass transition temperatures ($T_g$) differing by at least 10° C.

5. A method according to claim 1 wherein first the alternating structure of the two NLO polymers is formed, and then the successive electric fields are applied.

6. A method according to claim 1 wherein the two NLO polymers are amorphous, thermoplastic polymers with glass transition of temperatures ($T_g$) differing by at least 10° C.

7. A method according to claim 1 wherein the first NLO polymer employed is a thermosetting composition, which is cured with simultaneous exposure to the first poling field, prior to etching.

8. A method of making a frequency doubling structure in an optically non-linear polymeric material, in which method alternating poling is effected in the optically non-linear material, comprising the following steps:
   forming a layer of a first NLO polymer in a mold of such a toothed shape that, upon its release from the mold, the layer of the first NLO polymer will comprise a toothed structure formed by grooves in the polymer; and
   applying a layer of a second NLO polymer, such that the to formed grooves are backfilled, to form an alternating structure of the two NLO polymers,
   successive use being made of a first electric field and a second, oppositely directed electric field, such that the alternating structure of the two NLO polymers is subjected to the second electric field at a temperature which will not affect the poling of one NLO polymer effected by the first electric field.

9. A method according to claim 8 wherein the first NLO polymer employed is a thermosetting composition, which is cured with simultaneous exposure to the first poling field.

10. A method according to claim 9 wherein the two NLO polymers contain identical hyperpolarizable groups.

11. A method according to claim 8 wherein the two NLO polymers contain identical hyperpolarizable groups.

12. A device for doubling frequencies emitted by an approximately 700 to 1300 nm laser beam, which device comprises NLO polymer incorporating a frequency doubling alternating structure, such that oppositely poled sections of NLO polymer alternate, wherein the alternating sections of oppositely poled NLO polymer are each made up of a different NLO polymer, with the sections having the same alignment being made up of the same NLO polymer.

13. A device according to claim 12 wherein the space between successive sections of the same NLO polymer is equal to half of the coherence length of the second harmonic light waves generated by the frequency doubling structure.

14. A device according to claim 13 wherein the two different NLO polymers are similar polymers having a different $T_g$.

15. A device according to claim 13 wherein one of the two NLO polymers is a crosslinked NLO thermoset.

16. A device according to claim 13 wherein the two NLO polymers contain identical hyperpolarizable groups.

17. A device according to claim 12 wherein the two different NLO polymers are similar polymers having a different $T_g$.

18. A device according to claim 17 wherein the two NLO polymers are NLO polyurethanes.

19. A device according to claim 18 wherein the two NLO polymers contain identical hyperpolarizable groups.

20. A device according to claim 12 wherein one of the two NLO polymers is a crosslinked NLO thermoset.

21. A method according to claim 12 wherein the two NLO polymers contain identical hyperpolarizable groups.

* * * * *